United States Patent [19]

Katsura et al.

[11] Patent Number: 6,083,395
[45] Date of Patent: Jul. 4, 2000

[54] METHOD OF TREATING A WASTE WATER CONTAINING ORGANIC SOLIDS

[75] Inventors: Kenji Katsura; Masahiko Miura; Susumu Hasegawa, all of Kobe, Japan

[73] Assignee: Shinko Pantec Co., Ltd., Hyogo, Japan

[21] Appl. No.: 09/162,055

[22] Filed: Sep. 28, 1998

[51] Int. Cl.⁷ ..................................................... C02F 11/18
[52] U.S. Cl. ........................................... 210/606; 609/612
[58] Field of Search .................................... 210/606, 609, 210/612, 614, 632

[56] References Cited

U.S. PATENT DOCUMENTS

| | | | |
|---|---|---|---|
| 4,132,638 | 1/1979 | Carlsson | 210/606 |
| 4,915,840 | 4/1990 | Rozich | 210/605 |
| 5,271,845 | 12/1993 | Paquin | 210/606 |
| 5,514,277 | 5/1996 | Khudenko | 210/603 |
| 5,525,228 | 6/1996 | Dague et al. | 210/603 |
| 5,810,903 | 9/1998 | Branconnier et al. | 210/606 |

FOREIGN PATENT DOCUMENTS

| | | |
|---|---|---|
| 0 073 747 | 3/1983 | European Pat. Off. . |
| 6-206088 | 7/1994 | Japan . |
| 9-010791 | 1/1997 | Japan . |
| 9-099298 | 4/1997 | Japan . |
| 9-276887 | 10/1997 | Japan . |
| 10-337593 | 12/1998 | Japan . |

OTHER PUBLICATIONS

*Sewage Service Project—Design Guide and Explanation*, vol. 2, pp. 218–241 (1994).

Ghosh et al., "Anaerobic acidogenesis of wastewater sludge," *Journal Water Pollution Control Federation*, vol. 47, No. 1, Jan. 1975, pp. 30–45.

Eastman et al., "Solubilization of particulate organic carbon during the acid phase of anaerobic digestion," *Journal Water Pollution Control Federation*, vol. 53, No. 3, Mar. 1981, pp. 352–366.

Elefsiniotis et al., "Effect of HRT on acidogenic digestion of primary sludge," *Journal of Environmental Engineering*, vol. 120, No. 3, 1994, pp. 645–660.

Ponti et al., "Aerobic thermophilic treatment of sewage sludge at pilot plant scale. 1. Operating conditions," *Journal of Biotechnology*, vol. 38, No. 2, 1995, pp. 173–182.

*Primary Examiner*—Thomas G. Wyse
*Attorney, Agent, or Firm*—Marshall, O'Toole, Gerstein, Murray & Borun

[57] ABSTRACT

A method of continuously treating an organic waste water which simplifies the overall process, avoids lengthy solubilizing reactions to reduce the volume of a solubilizing vessel, and effectively performs the solubilizing treatment is disclosed. In the method of continuously treating an organic waste water containing organic solids, the solubilizing treatment for the organic sludge is carried out using heat and under conditions such that a sludge solubilization enzyme is produced and secreted from a microorganism to promote solubilization, and the solubilizing treatment time is determined based on a hydraulic residence time of a treated solution in a solubilizing treatment device.

1 Claim, 5 Drawing Sheets

METHOD OF TREATING A WASTE WATER CONTAINING ORGANIC SOLIDS

FIELD OF THE INVENTION

The present invention relates to a method of continuously treating an organic waste water containing organic solids, for example, a waste sludge containing a raw sludge and a biological sludge, which are discharged in a sewage treatment process, such as a sewage treatment plant, a night soil treatment plant, or the like, and organic solids discharged from a food factory, a chemical factory, and the like, by utilizing a biological reaction.

BACKGROUND OF THE INVENTION

Conventionally, the following method has widely been used as a general method for treating an organic waste water. First, organic components of an organic sludge are biologically digested by aerobic or anaerobic microorganism decomposition, such as an aerobic digestion method, an anaerobic methane fermentation method, and the like, such that organic matter is decomposed into gas components, such as carbon dioxide, methane gas, and the like. Then, the sludge containing mainly a microorganism biomass generated by the biological digestion and untreated residual solids is solid-liquid separated by means of a precipitation vessel, or other suitable apparatus. While the treated, supernatant water is suitably processed, the excess sludge usually is discarded by dumping at sea or on land. However, dumping excess sludge at sea adversely affects the environment. Therefore, dumping a sludge at sea has been essentially prohibited because of global environmental protection initiatives. Furthermore, each year it has become harder to find a land disposal area in which an excess sludge can be dumped.

The present invention is related to an activated sludge treatment method and apparatus capable of substantially reducing the amount of excess sludge generated by treating organic waste water. It has been reported previously that an activated sludge treatment method and apparatus is characterized in that, as shown in FIG. 4, an organic waste water introduced from an organic waste water reservoir 1 is subjected to aerobic biological treatment in an aeration tank 2, the treated waste water then is solid-liquid separated into treated water and a sludge by a precipitation device 3. A portion of the sludge separated by precipitation device 3 is returned to aeration tank 2 through a recycle route 4, an excess sludge separated by precipitation device 3 is heat exchanged by a heat exchanger 5, and then is solubilized by a solubilizing treatment device 6. A treated solution obtained by solubilization performed by solubilizing treatment device 6 is returned to aeration tank 2 through a return route 7 (see Japanese Patent Application No. Hei 7-163355).

In one embodiment of the invention disclosed in Hei 7-163355, about 50% of a solid is solubilized and about 50% of a volatile matter is removed, when the treatment of the excess sludge is performed over a residence time set at 5 days. If the excess sludge is to be fully solubilized, the treatment then is performed at a high temperature. Accordingly, a large amount of excess sludge is treated for a long time by means of a solubilizing treatment device including a large capacity vessel. Consequently, the scale of the required equipment is large, which results in an increase in operating and maintenance costs for heating and the like. Thus, there are disadvantages to industrially performing the method set forth in Hei 7-163355.

Japanese Patent Application No. Hei 7-260287 discloses a sludge digesting treatment method comprising a step of producing enzymes capable of solubilizing sludge and an apparatus for performing the same (see FIG. 5). The enzyme producing step is performed by incubating a microorganism obtained from a sludge, or a different source, under proper conditions, and the enzyme produced and secreted by incubation is used to promote solubilization of the sludge in a solubilizing vessel, thereby reducing the amount of excess sludge. Although the specification of Hei 7-260287 discloses preferred conditions, such as temperature, pH, time, and the like, under which the solubilizing reaction is conducted, it is apparent that such conditions are appropriately selected depending on the concentration of sludge to be treated, the composition and physical properties of the organic matter or the like, and the enzymatic properties of the secreted enzyme. The selection criteria, however, have not been clearly established. According to this method, it is expected that the solubilization efficiency in the solubilizing vessel can be increased. However, because the steps of producing and digesting the enzyme are essential, the entire operation is relatively complicated, which often results in an increased size of equipment.

SUMMARY OF THE INVENTION

In consideration of the foregoing drawbacks of the prior art, it is an aspect of the present invention to provide a simple process for treating waste water that shortens the solubilizing reaction time, and efficiently achieves a sufficient amount of sludge solubilization.

In order to attain the above-mentioned aspect, the present invention provides a method of continuously treating an organic waste water containing organic solids, wherein organic solids are solubilized using heat, and under conditions wherein a sludge solubilization enzyme is produced and secreted from a microorganism to promote solubilization, and wherein solubilizing treatment time is determined based on a hydraulic residence time (hereinafter referred to as "HRT") of a treated solution in a solubilizing treatment device.

In accordance to the present invention, solubilization is performed continuously under conditions such that enzyme production and solubilization both can be performed. Consequently, the process is simplified. In addition, because the treatment time is determined based on the HRT, a lengthy solubilizing reaction can be avoided. Thus, the volume of the solubilizing vessel can be reduced and the solubilizing treatment can be performed efficiently.

DESCRIPTION OF THE PREFERRED EMBODIMENTS

Figure 1:
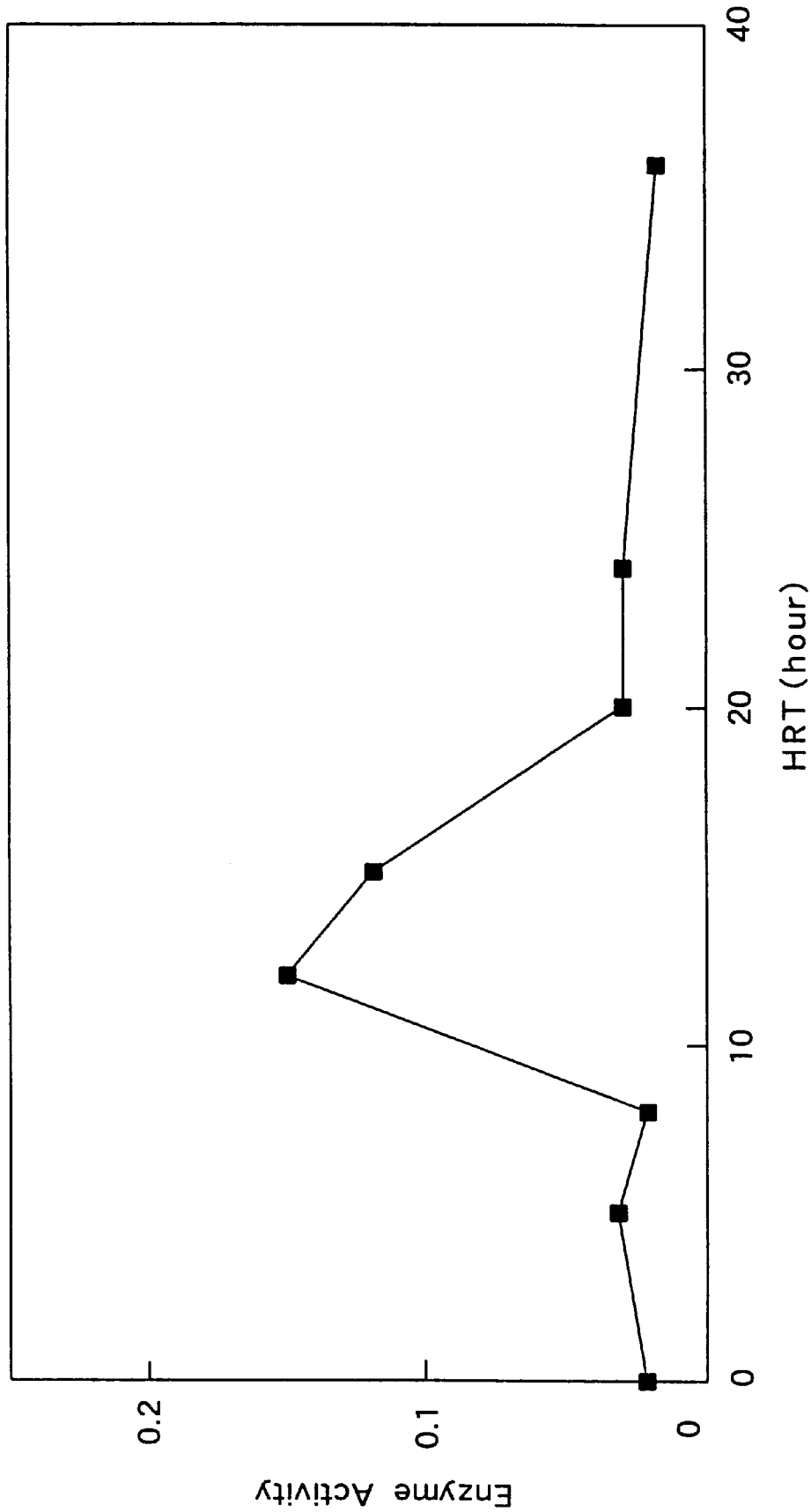
FIG. 1 is a graph representing a transition of protease production by a bacillus relative to an HRT at a solubilizing step according to a method of the present invention.

An embodiment of the present invention is described below.

The present invention provides a method of continuously treating an organic waste water, wherein the method comprises the steps of (1) aerobically treating the organic waste water in an aeration tank, (2) solid-liquid separating the resulting treated solution in a precipitation device to obtain a treated water and a sludge, (3) returning a portion of the sludge to the aeration tank used in step (1) and solubilizing an excess sludge derived from the sludge by a solubilizing treatment device, and (4) returning the treated solution to the aeration tank used in step (1) after being solubilized, wherein the solubilizing treatment in step (3) is carried out using heat and under conditions such that a sludge solubilization enzyme is produced and secreted from either a microorganism contained in the excess sludge or a microorganism derived from another separate source to promote solubilization thereby, and such that the solubilizing treatment time is determined based on an HRT of the treated solution in the solubilizing treatment device.

The aeration tank, the precipitation device, the solubilizing treatment device and return route used in steps (1) to (4) are not specifically restricted, and known apparatus can be utilized. The conditions, and the like, utilized in steps (1) and (2) can be established in conformity with well-known aerobic treatment and solid-liquid separation methods according to the prior art (see Japanese Patent Appication No. Hei 7-163355).

More specifically, the following represents a solubilization carried out using heat and under conditions that a sludge solubilization enzyme is produced and secreted from a microorganism to promote solubilization in step (3).

1. Temperature: 50° C. to 80° C., preferably 60° C. to 70° C.;
2. Concentration of sludge: 1000 mg/liter or more, preferably 5000 mg/liter or more;
3. pH: 7 to 9, preferably 7.5 to 8.5;
4. Environment: aerobic or microaerobic conditions; and
5. Time: determined based on the HRT in the solubilizing vessel for the excess sludge.

In cases where the excess sludge is solubilized continuously, the HRT is determined from the amount of an inflow and an effective volume of a reactor. In other words, the HRT can be calculated based on the equation: HRT (hydraulic residence time)=VA/Q (VA is the volume of the reaction vessel, Q is the amount of the inflow).

HRT is directly proportional to the volume of the reactor. The excess sludge is solubilized in a solubilizing treatment device, i.e., a reactor. Therefore, to achieve solubilization to a desired extent, it is apparent that the volume of the reactor can be reduced as the HRT is shortened. Consequently, it is possible to avoid a lengthy solubilization treatment by determining the solubilization time based on the minimum HRT that achieve a desired degree of solubilization.

It is preferred that the production and secretion amounts of the sludge solubilization enzyme in step (3) are monitored to select an HRT based on an HRT at which the production and secretion amounts are maximized. If the HRT is thus set, reactions performed by the produced and secreted sludge solubilization enzyme can efficiently be utilized.

Furthermore, it is preferred that the HRT is set to 3 to 24 hours to perform the solubilizing treatment.

EXAMPLES

While the examples of the present invention are described below, the scope of the present invention is not restricted thereto.

Example 1

Change in Enzyme Production by Microorganism According to Residence Times

A yeast-peptone medium (manufactured by DIFCO Co., Ltd. (4 gram of yeast extract, 8 gram of peptone, and 1 liter of water, pH 6.8) was placed in a reactor made of glass, and bacillus stearothermophilus SPT 2-1 [FERM P-15395] derived from a sludge that had been preincubated was inoculated and was incubated with shaking at a temperature of 65° C. An HRT first was set to 36 hours while an incubation solution is continuously supplied. In order to shorten the HRT to a predetermined time, while the amount of an organic matter to be supplied is kept constant, an appropriate amount of dilution water was added to perform the incubation. A supernatant solution was sampled at each residence time, and each protease activity was measured as follows. More specifically, an equivalent amount of sample was added to 0.7 ml of a solution (5 mg/ml) obtained by suspending azocoal (tradename, manufactured by Sigma Co., Ltd.) acting as a substrate for nonspecific protease assay into a phosphoric acid buffer solution having pH 7.0. The mixture was incubated for 30 minutes at a temperature of 70° C. After the reaction was completed, an absorbancy at 520 nm was measured. When measurement was similarly performed by using, as a sample, 30 μg/ml of the phosphoric acid buffer solution (pH 7.0) of trypsin (about 400 BAEE U/mg, manufactured by Wako Junyaku Co., Ltd.), an absorbancy of 1.0 was obtained at 520 nm.

The obtained results are shown in FIG. 1. It has been found that the enzyme activity reaches a peak at an HRT of 12 hours and is reduced to a lower level before an HRT of 20 hours. Accordingly, it is apparent that the HRT suitable for the enzyme production by said strain is about 12 hours.

Example 2

Change in Enzyme Production by an Excess Sludge According to a Residence Time

An excess sludge derived from a sewage treatment plant which has an organic solid (vss: volatile suspended solids) concentration of 3% by weight was placed in a jar fermenter made of glass having an effective volume of 5 liter, and was treated at a temperature of 65° C., an airflow quantity of 0.3 vvm (volume/volume/minute) and a stirring speed of 300 rpm (revolutions per minute). In the same manner as Example 1, an HRT first was set at 36 hours, dilution water was appropriately injected to set a predetermined HRT, and the protease activity at each HRT was measured. The abbreviation "vvm" denotes volume of air/volume of reactor/minute.

Figure 2:
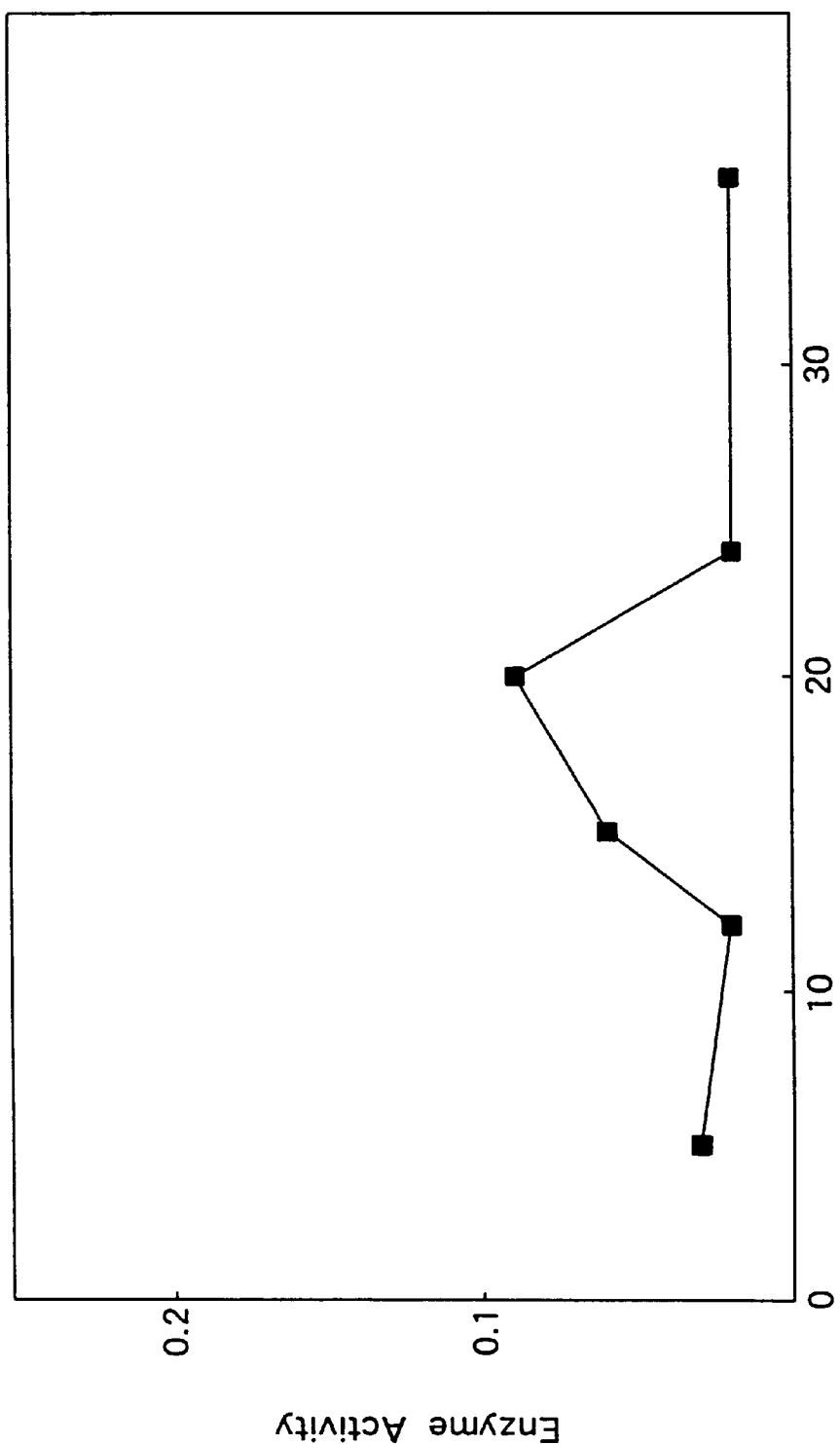
FIG. 2 is a graph representing a transition of protease production by an excess sludge relative to the HRT at the solubilizing step according to the method of the present invention.

The results are shown in FIG. 2. It has been found that the enzyme activity reaches a peak at an HRT of 15 to 20 hours and is reduced to a lower level before an HRT of 25 hours. Accordingly, it is apparent that the HRT suitable for the enzyme production is about 20 hours.

Example 3

Change in Solubilization Ratio of Excess Sludge According to Residence Time

An excess sludge was treated in the same manner as in Example 2. A solubilization sample was taken at each HRT to measure the organic solid (vss) content, and the solubilization ratio (%) at each time was calculated based on the vss content obtained before the treatment. The vss content was measured according to JIS-K-0102.

Figure 3:
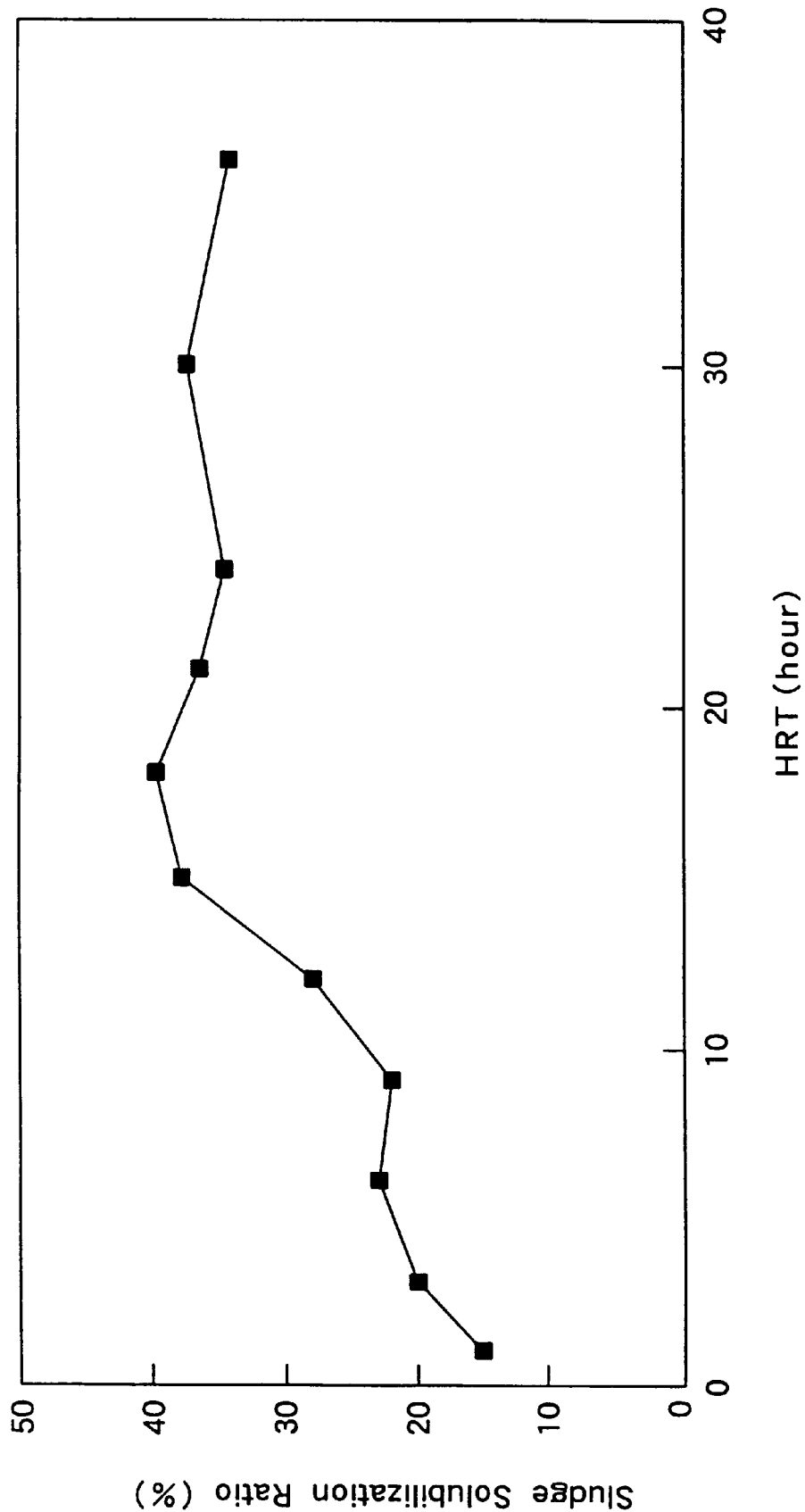
FIG. 3 is a graph representing a transition of a solubilization ratio of the excess sludge relative to the HRT at the solubilizing step according to the method of the present invention.
Figure 4:
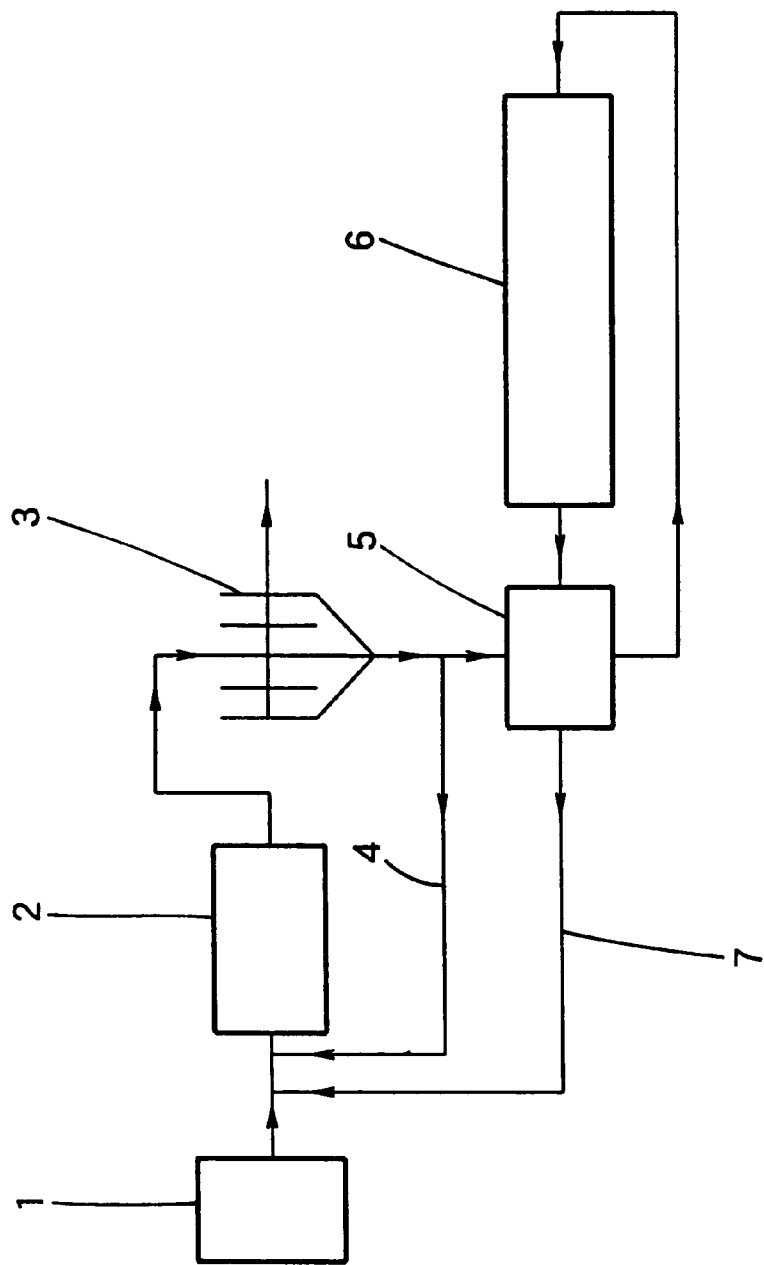
FIG. 4 is a schematic view showing a structure of an organic waste water treatment device according to the prior art.
Figure 5:
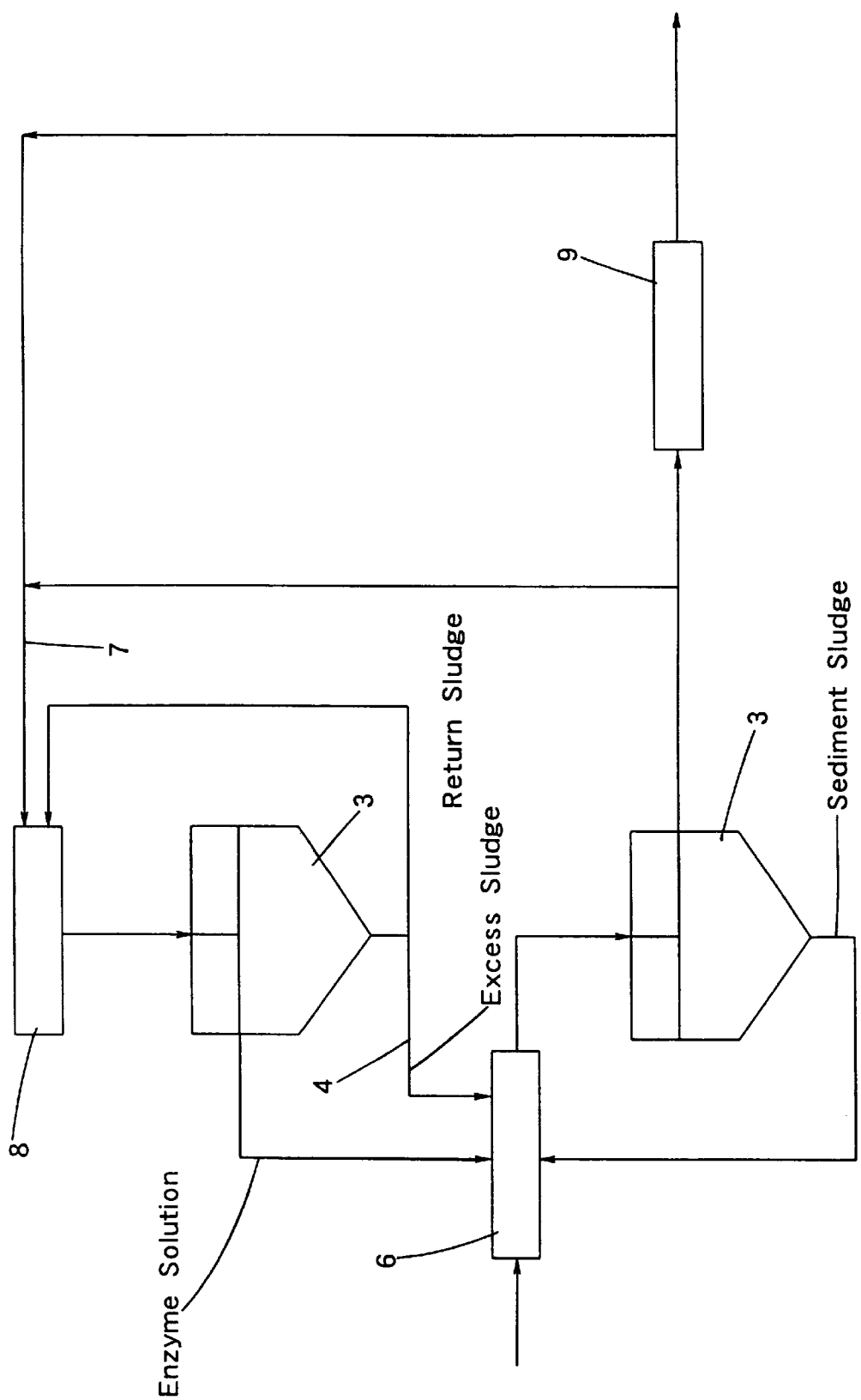
FIG. 5 is a schematic view showing a structure of another organic waste water treatment device according to the prior art.

The results are shown in FIG. 3. It is apparent from FIG. 3 that the solubilization ratio is maximized at an HRT of about 15 to 20 hours, and a solubilization peak, which is attributed to heating, can be detected at an HRT of 3 to 9 hours.

From the results of Examples 2 and 3, the following was observed. More specifically, in a case where 3% by weight of the excess sludge derived from the sewage treatment plant is to be solubilized under conditions suitable for enzyme production, it is preferred that protease activity is monitored to select an HRT based on the HRT at which the protease activity reaches a peak. In this case, it is obvious that the solubilization can efficiently be performed at an HRT of 3 to 24 hours.

During the solubilizing step of the method of continuously treating an organic waste water containing organic solids according to the present invention, solubilization is performed under conditions such that both enzyme production and solubilization can be performed. Consequently, the overall process is simplified. In addition, since treatment time is determined based on the HRT, a lengthy solubilizing reaction can be avoided. Therefore, the volume of the solubilizing vessel can be reduced, and the solubilizing treatment can be performed effectively.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. In a method of continuously treating an organic waste water containing organic solids, wherein the organic solids are solubilized by heat and under conditions wherein a sludge solubilization enzyme is produced and secreted from a microorganism to promote solids solubilization, and wherein a solubilizing treatment time is determined based on a hydraulic residence time of a treated solution in a solubilizing treatment device, the improvement which comprises the method of treating the organic waste water, wherein the solubilization is carried out at a temperature of 50° C. to 80° C. and the hydraulic residence time of the treated solution is 3 to 24 hours such that production and secretion amounts of the sludge solubilization enzyme in the solubilizing treatment are maximized.

* * * * *